United States Patent
Lee et al.

(10) Patent No.: US 10,787,058 B2
(45) Date of Patent: Sep. 29, 2020

(54) AIR CONDITIONER FOR VEHICLES, CONTROLLER OF AIR CONDITIONER FOR VEHICLES

(71) Applicants: Hyundai Motor Company, Seoul (KR); Kia Motors Corporation, Seoul (KR); DOOWON CLIMATE CONTROL CO., LTD, Ansan-si (KR)

(72) Inventors: Kyeong-Hyeon Lee, Hwaseong-si (KR); Yong-Chul Kim, Hwaseong-si (KR); Jun-Sic Jung, Asan-si (KR)

(73) Assignees: Hyundai Motor Company, Seoul (KR); Kia Motors Corporation, Seoul (KR); DOOWON CLIMATE CONTROL CO., LTD., Asan-si (KR)

( * ) Notice: Subject to any disclaimer, the term of this patent is extended or adjusted under 35 U.S.C. 154(b) by 114 days.

(21) Appl. No.: 15/861,446

(22) Filed: Jan. 3, 2018

(65) Prior Publication Data
US 2018/0290517 A1    Oct. 11, 2018

(30) Foreign Application Priority Data
Apr. 7, 2017   (KR) .......................... 10-2017-0045433

(51) Int. Cl.
*B60H 1/00* (2006.01)

(52) U.S. Cl.
CPC ..... *B60H 1/00835* (2013.01); *B60H 1/00021* (2013.01); *B60H 1/00857* (2013.01); *B60H 1/00028* (2013.01); *B60H 2001/00092* (2013.01); *B60H 2001/00185* (2013.01)

(58) Field of Classification Search
CPC ............ B60H 1/00835; B60H 1/00021; B60H 1/00857
See application file for complete search history.

(56) References Cited

U.S. PATENT DOCUMENTS

2017/0106722 A1*   4/2017   Nolta ................. B60H 1/00857

\* cited by examiner

*Primary Examiner* — Elizabeth J Martin
*Assistant Examiner* — Nael N Babaa
(74) *Attorney, Agent, or Firm* — Morgan, Lewis & Bockius LLP

(57) ABSTRACT

An air conditioner for a vehicle including a case body having a floor outlet, a roof outlet, an evaporator, and a heater core; a mode door adjusting an opening amount of each of the vents; and a temp door adjusting an opening amount of a cold-air passage and a hot-air passage, includes: an actuator lever connected to an actuator provided in the case body, and a main lever connected to the actuator lever to simultaneously control the mode door and the temp door.

13 Claims, 10 Drawing Sheets

AIR CONDITIONER FOR VEHICLES, CONTROLLER OF AIR CONDITIONER FOR VEHICLES

CROSS-REFERENCE(S) TO RELATED APPLICATIONS

The present application claims priority to Korean Patent Application No. 10-2017-0045433, filed on Apr. 7, 2017, the entire contents of which is incorporated herein for all purposes by this reference.

BACKGROUND OF THE INVENTION

Field of the Invention

The present invention relates to an air conditioner for a vehicle, a controller of the air conditioner for the vehicle, and a control method thereof; and particularly to an air conditioner for a vehicle, a controller of the air conditioner for the vehicle, and a control method thereof, which are capable of simplifying a configuration by simultaneously driving both a mode and a temp using one actuator.

Description of Related Art

In general, an air conditioner for a vehicle is configured such that outside air introduced into the vehicle by a blower device selectively passes through an evaporator in which refrigerant flows or a heater core in which coolant of an engine of the vehicle flows, thus performing a heat exchange process, and then cool air or hot air is distributed in several directions within the vehicle via vents communicating with respective parts inside the vehicle, thus cooling or heating an internal of the vehicle.

Referring to FIG. 1, a general air conditioner is partitioned into a first air flow path and a second air flow path by a guide wall which is curved and extends from a lower surface to an upper surface, thus causing air introduced from an air inlet formed in an entrance side of a case body 10 by a blower device to be discharged to an exit side.

An evaporator 11 and a heater core 13 are disposed, respectively, at an upstream side and a downstream side of the first air flow path. A cold-air passage for causing air cooled by the evaporator 11 to pass therethrough and a hot-air passage for causing air heated by the heater core 13 to pass therethrough are formed in the first air flow path. A temp door 15 is rotatably provided between the evaporator 11 and the heater core 13 to adjust an air amount that selectively passes through the cold-air passage and the hot-air passage.

Meanwhile, a defrost vent 12a, a face vent 12b, and a floor vent 12 are disposed at the exit side of the case body 10. Depending on an opening amount of the temp door 15, the defrost vent 12a removes frost from a vehicle windshield by discharging air to the windshield, the face vent 12b discharges air to an upper portion inside the vehicle, and the floor vent 12 discharges air to a lower portion inside the vehicle. Simultaneously, a defrost door 16, a surface door 16, and a floor door 16, which are mode doors for selectively adjusting the amount of cool/hot air depending on the opening amount of the temp door 15 and discharging the cool/hot air through the respective vents 12a, 12b, and 12 to the internal of the vehicle, are disposed at the exit side of the case body 10.

However, the conventional air conditioner has a mode actuator, an actuator lever, a door lever and others on a mode side, and likewise has a temp actuator, an actuator lever and others on a temp side.

Accordingly, the conventional air conditioner is problematic in that both the mode side and the temp side require the actuators, thus leading to a complex configuration and an increase in weight of the air conditioner.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an air conditioner for a vehicle, in which a main lever is formed in the shape of a disc protruding radially at a portion of a circumference thereof, a mode door trajectory is formed on a portion of the circumference, and a temp door trajectory is formed at a position facing the mode door trajectory, thus allowing both a mode and a temp to be simultaneously driven using one actuator, and realizing a simple configuration.

Various aspects of the present invention are directed to providing a controller of an air conditioner for a vehicle and a control method thereof, in which a display device has symbols that are successively formed on a side with respect to a central line of a mode selecting device to indicate each mode and air temperature, thus facilitating a convenient operation, reducing the number of components due to an integrated mode/temp structure, and realizing an aesthetic design.

In accordance with various exemplary embodiments of the present invention, there is provided an air conditioner for a vehicle including a case body having a floor outlet, a roof outlet, an evaporator, and a heater core; a mode door adjusting an opening amount of each of the vents; and a temp door adjusting an opening amount of a cold-air passage and a hot-air passage, the air conditioner including: an actuator lever connected to an actuator provided in the case body; and a main lever connected to the actuator lever to simultaneously control both the mode door and the temp door.

The main lever may be formed in a shape of a disc protruding radially at a portion of a circumference thereof, a mode door trajectory may be formed on the portion of the circumference, and a temp door trajectory may be formed at a position facing the mode door trajectory.

Each of the mode door trajectory and the temp door trajectory may be formed non-linearly.

The mode door trajectory may be formed as a trajectory.

The mode door trajectory includes: a vent mode trajectory formed adjacent to a gear portion of the main lever; a bilevel mode trajectory formed to be longer in radius from the center of the main lever than the vent mode trajectory; and a floor mode trajectory formed to be longer in radius from the center of the main lever than the bilevel mode trajectory.

The mode door may be connected via a link with a mode door rotary pin, and a first side of the mode door rotary pin may be connected to a first guide lever moving along the mode door trajectory.

A second side of the mode door rotary pin may be rotatably connected at a predetermined position of the case body.

The temp door trajectory may be formed as a dual trajectory.

The temp door trajectory includes: a temp-vent trajectory formed at a position facing the vent mode trajectory; a temp-bilevel trajectory formed at a position facing the bilevel trajectory; and a temp-floor trajectory formed at a position facing the floor mode trajectory.

Each of the trajectories of the temp door may be formed such that a radius of a trajectory for forming a hot zone is greater than a radius of a trajectory for forming a cool zone.

Each of the temp-vent trajectory and the temp-floor trajectory includes: an internal trajectory which is open at a top and a bottom portion thereof and is adjacent to a center of a circle of the main lever; and an external trajectory which is formed around the internal trajectory and is closed at a top thereof.

The temp-bilevel trajectory may be connected to the internal trajectory, and is formed as a trajectory which is closed at a top thereof.

The temp door may be connected via a link with a temp door rotary pin, and the temp door rotary pin may be connected at a first side thereof with a second guide lever moving along the temp door trajectory.

The second guide lever may be formed as a dual structure to move along the dual trajectory.

The temp door rotary pin may be rotatably connected at a second side thereof at a predetermined position of the case body.

In accordance with various exemplary embodiments of the present invention, there is provided a controller of an air conditioner for a vehicle including a ring-shaped display device; a temperature-adjustment/mode selecting device simultaneously operating both a temp door and a mode door of the air conditioner for the vehicle and formed in a disk shape to be rotatable with respect to the display device; and an indicating device configured formed in the mode selecting device to indicate a predetermined portion in the display device.

The display device may have symbols that are successively formed on a side with respect to a central line of the mode selecting device to indicate a mode and an air temperature.

The display device includes: a first symbol formed on a left side with respect to a bilateral center line of the mode selecting device to indicate a vent mode and an air temperature; a second symbol formed on an upper side with respect to the bilateral center line of the mode selecting device to indicate a bilevel mode and the air temperature; and a third symbol formed on a right side with respect to the bilateral center line of the mode selecting device to indicate a floor mode and the air temperature.

Each of the symbols indicating the air temperature of the display device may be formed in an order of heating-cooling-cooling-heating-heating-cooling.

A maximum heating mode or a maximum cooling mode may be displayed at left and right end portions of each of the symbols indicating the air temperature of the display device.

In accordance with a further exemplary embodiment of the present invention, there is provided a control method of a controller of an air conditioner for a vehicle, including forming a display device as a first symbol formed on a left side with respect to a bilateral center line of a mode selecting device to indicate a vent mode and an air temperature; a second symbol formed on an upper side with respect to the bilateral center line of the mode selecting device to indicate a bilevel mode and the air temperature; and a third symbol formed on a right side with respect to the bilateral center line of the mode selecting device to indicate a floor mode and the air temperature; and rotating the mode selecting device clockwise or counterclockwise in an order of the vent mode, the bilevel mode, and the floor mode or in a reverse order, thus selecting any one of air conditioning modes.

The control method may further include: selecting a maximum heating mode or a maximum cooling mode at left and right end portions of each of the symbols indicating the air temperature of the display device.

According to an exemplary embodiment of the present invention, both a mode door and a temp door are simultaneously driven by one actuator to simultaneously control a mode and a temp, and a second guide lever is formed in a dual structure, thus allowing the temp door to be stably and smoothly operated when the mode door is not moved.

Furthermore, according to an exemplary embodiment of the present invention, a display device has symbols that are successively formed on a side with respect to a central line of a mode selecting device to indicate each mode and air temperature, thus facilitating a convenient operation, reducing the number of components due to an integrated mode/temp structure, and realizing an aesthetic design.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
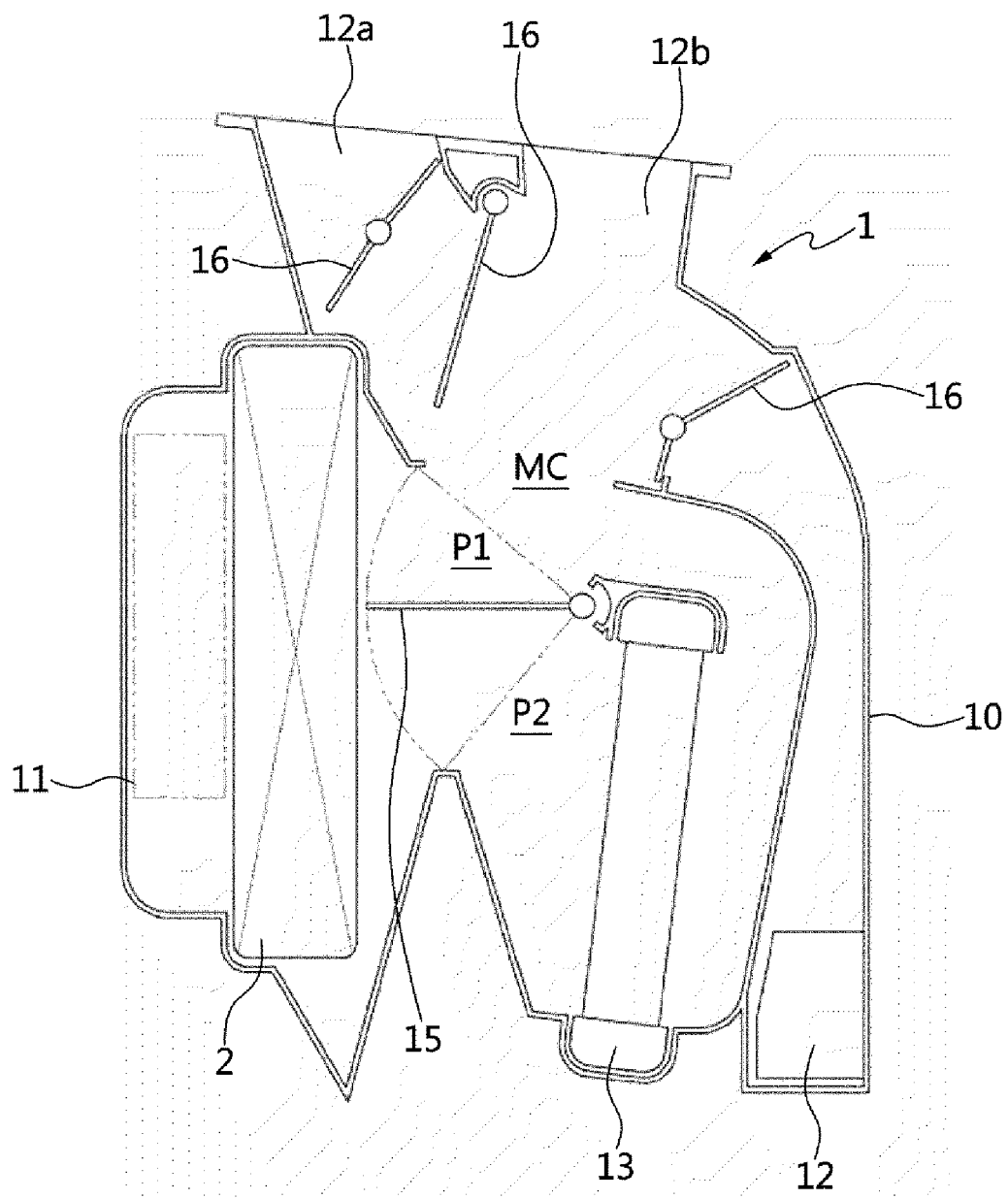
FIG. 1 is a sectional view illustrating a conventional air conditioner for a vehicle.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the intended application and use environment.

In the figures, reference numbers refer to the same or equivalent parts of the present invention throughout the several figures of the drawing.

DETAILED DESCRIPTION

Reference will now be made more specifically to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On another hand, the invention(s) is/are intended to cover not only the exemplary embodiments, but also various alternatives, modifications, equivalents and other embodiments, which may be included within the spirit and scope of the invention as defined by the appended claims.

The terms or words used in the description and the claims of the present invention should not be interpreted as being limited merely to common and dictionary meanings. On another hand, they should be interpreted based on the meanings and concepts of the invention in keeping with the scope of the invention on the basis of the principle that the inventor(s) can appropriately define the terms in order to describe the invention in the best way. The present invention may, however, be embodied in different forms and should not be construed as limited to the exemplary embodiments set forth herein. In various exemplary embodiments, irrelevant to the present invention may be omitted to avoid obscuring appreciation of the disclosure. Exemplary embodiments of the present invention will be described below in more detail with reference to the accompanying drawings.

Figure 2:
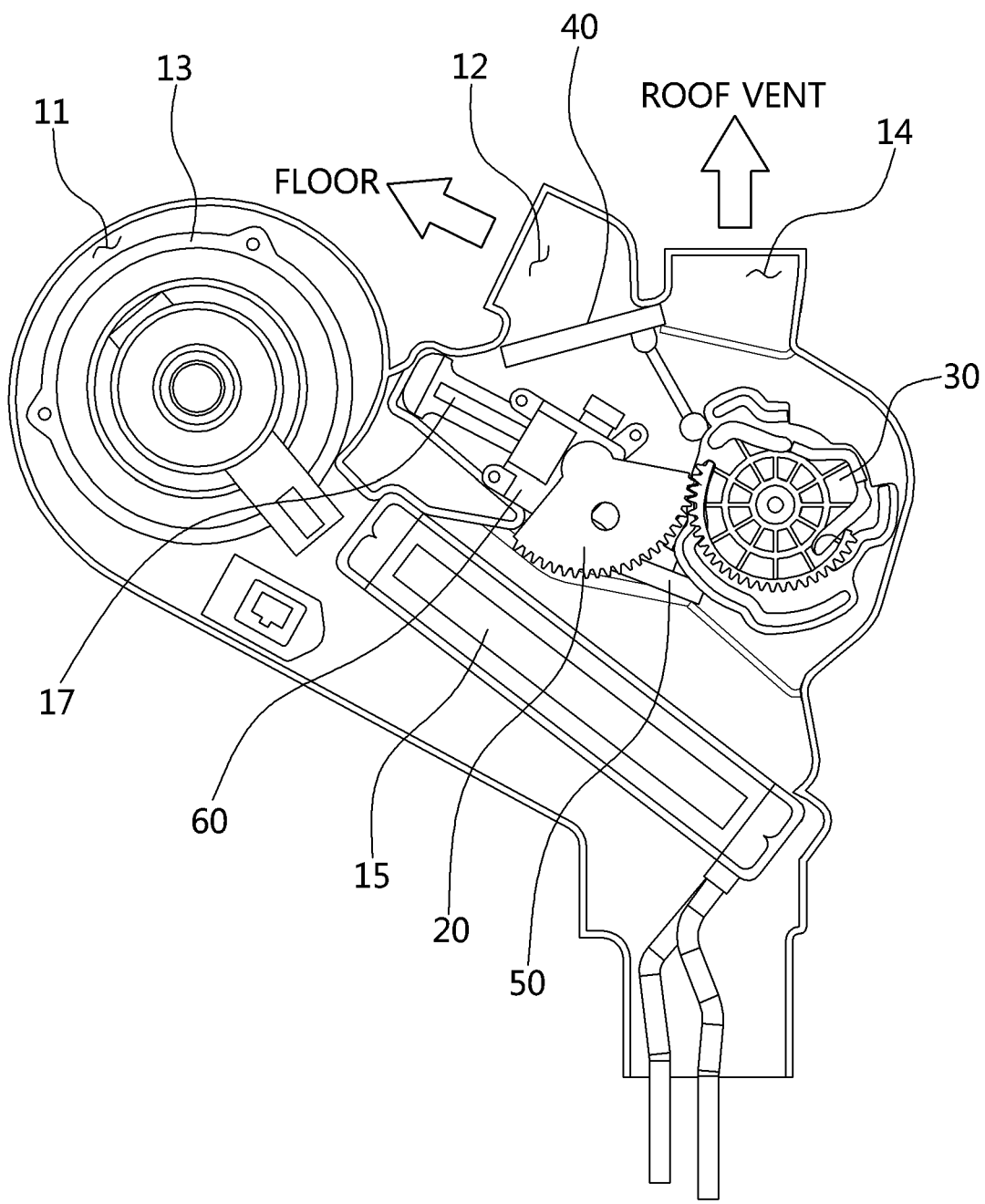
FIG. 2 is a sectional view illustrating an air conditioner for a vehicle according to an exemplary embodiment of the present invention.

FIG. 2 is a sectional view illustrating an air conditioner for a vehicle according to an exemplary embodiment of the present invention.

Figure 3A:
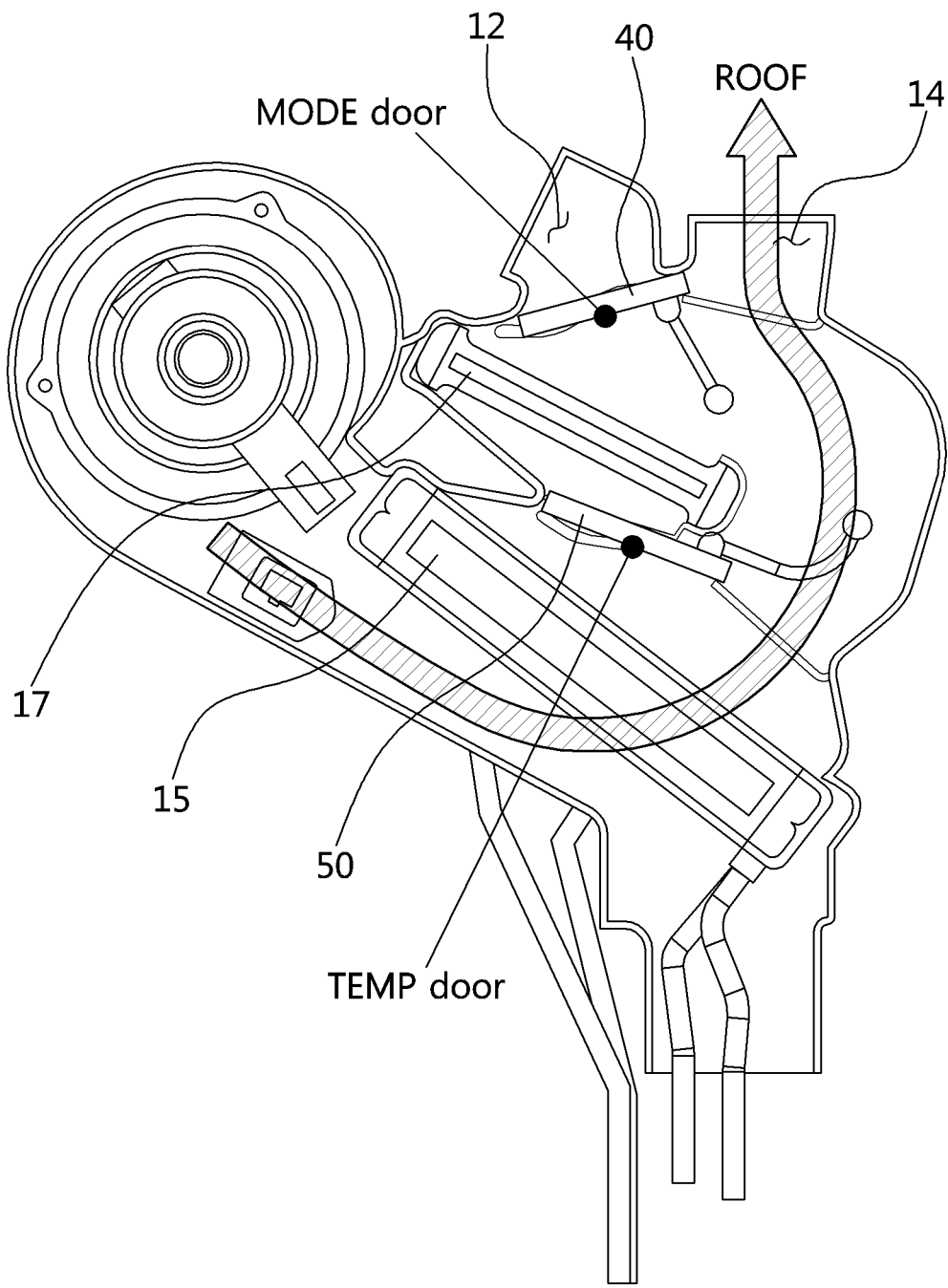
FIG. 3A is a sectional view illustrating a vent mode of the air conditioner for the vehicle according to an exemplary embodiment of the present invention.
Figure 3B:
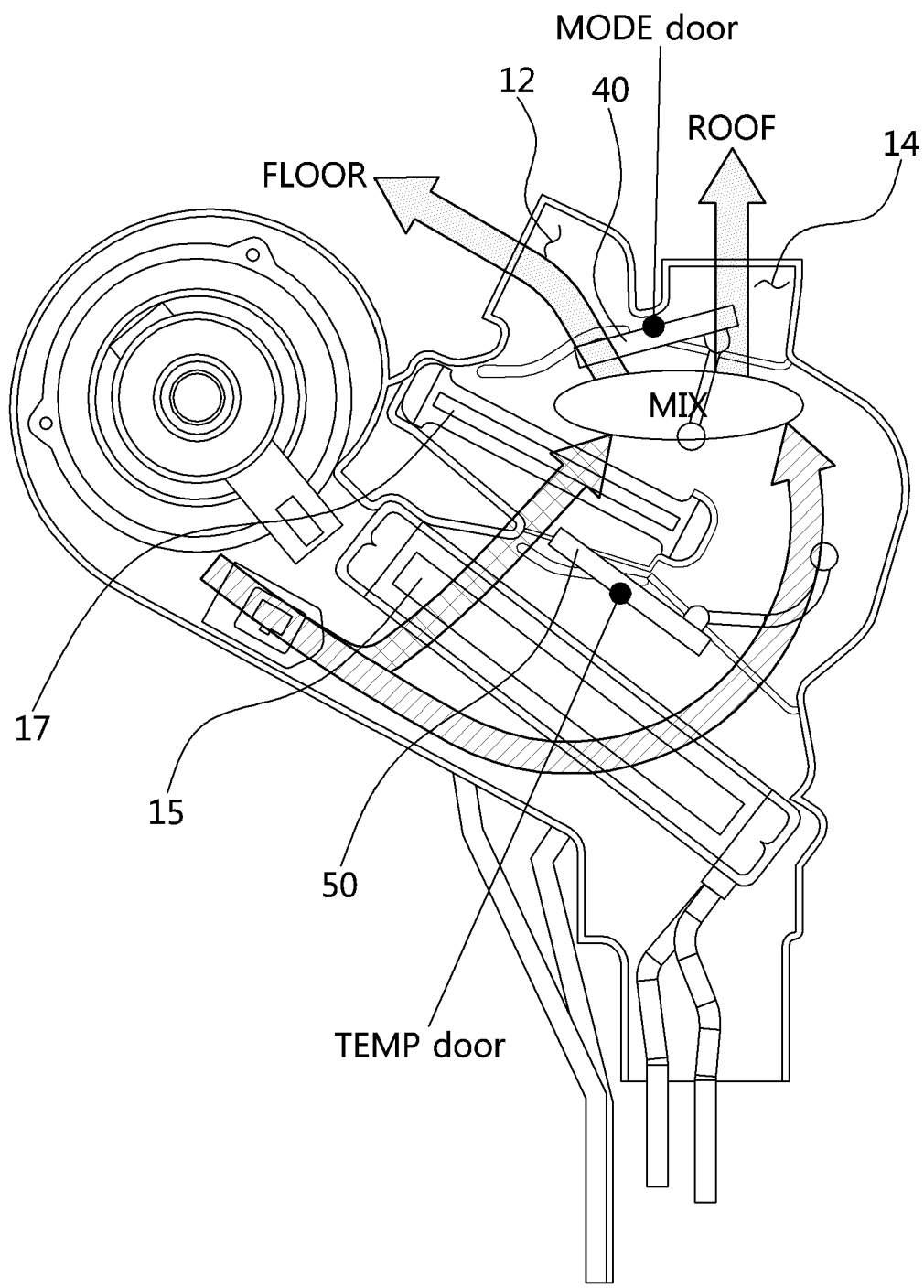
FIG. 3B is a sectional view illustrating a bilevel mode of the air conditioner for the vehicle according to an exemplary embodiment of the present invention.
Figure 3C:
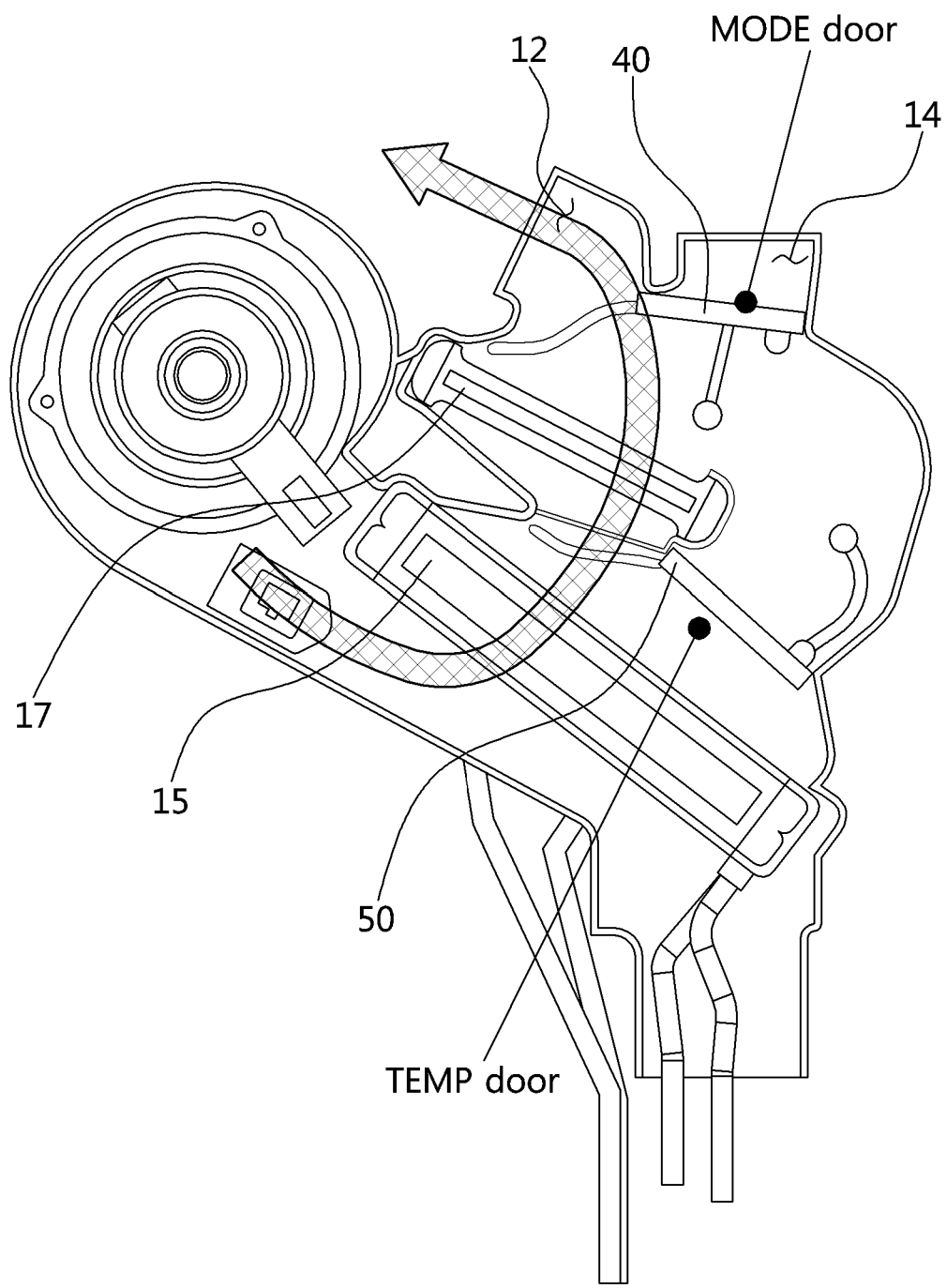
FIG. 3C is a sectional view illustrating a floor mode of the air conditioner for the vehicle according to an exemplary embodiment of the present invention.

FIG. 3A is a sectional view illustrating a vent mode of the air conditioner for the vehicle according to an exemplary embodiment of the present invention, FIG. 3B is a sectional view illustrating a bilevel mode of the air conditioner for the vehicle according to an exemplary embodiment of the present invention, and FIG. 3C is a sectional view illustrating a floor mode of the air conditioner for the vehicle according to an exemplary embodiment of the present invention.

Referring to FIG. 2, the air conditioner for the vehicle according to an exemplary embodiment of the present invention includes: a case body having a blowing passage 11, a blower device 13, a floor outlet 12, a roof outlet 14, an evaporator 15, and a heater core 17, gear portion 31a, actuator lever 20, a main lever 30, a mode door 40 adjusting an opening amount of each of outlets 12 and 14, a temp door 50 adjusting an opening amount of each of a cold-air passage C and a hot-air passage H, and an actuator 60.

Air is forcibly introduced into the blowing passage 11 by the blower device 13, and the evaporator 15 and the heater core 17 are provided to cool or heat the introduced air.

The evaporator 15 is formed in an air flow path through which air is discharged from the blowing passage 11 to the floor outlet 12 or the roof outlet 14, and has a length to cover a portion of the air flow path. The heater core 17 may be formed adjacent to the floor outlet 12.

The temp door 50 is rotatably formed between the heater core 17 and the evaporator 15 to cause air passing through the evaporator 15 to selectively pass through the heater core 17 and adjust a temperature.

Furthermore, the mode door 40 is disposed between the floor outlet 12 and the roof outlet 14.

The actuator 60 is provided in the case body 19, and the actuator lever 20 transmits a driving force generated by the actuator 60 to the main lever 30.

That is, if a controller that will be described below is operated, an electric motor of the actuator 60 is driven, so that a driving force is transmitted to the actuator lever 20. Accordingly, the actuator lever 20 is rotated, so that the main lever 30 is driven.

As the main lever 30 is driven, the mode door 40 is operated to implement each mode and simultaneously operate the temp door 50, thus adjusting the temperature of air.

Referring to FIG. 3A, the floor outlet 12 is closed, so that a vent mode is implemented, in which air subjected to a heat exchange process by the temp door 50 passes through only the roof outlet 14.

Furthermore, referring to FIG. 3B, only parts of the floor outlet 12 and the roof outlet 14 are closed, so that a bilevel mode is implemented, in which air subjected to the heat exchange process by the temp door 50 simultaneously passes through both the floor outlet 12 and the roof outlet 14.

Furthermore, referring to FIG. 3C, the roof outlet 14 is closed, so that a floor mode is implemented, in which air subjected to the heat exchange process by the temp door 50 passes through only the floor outlet 12.

By rotating the temp door 50 in each mode, a heating operation or a cooling operation may be implemented.

Figure 4:
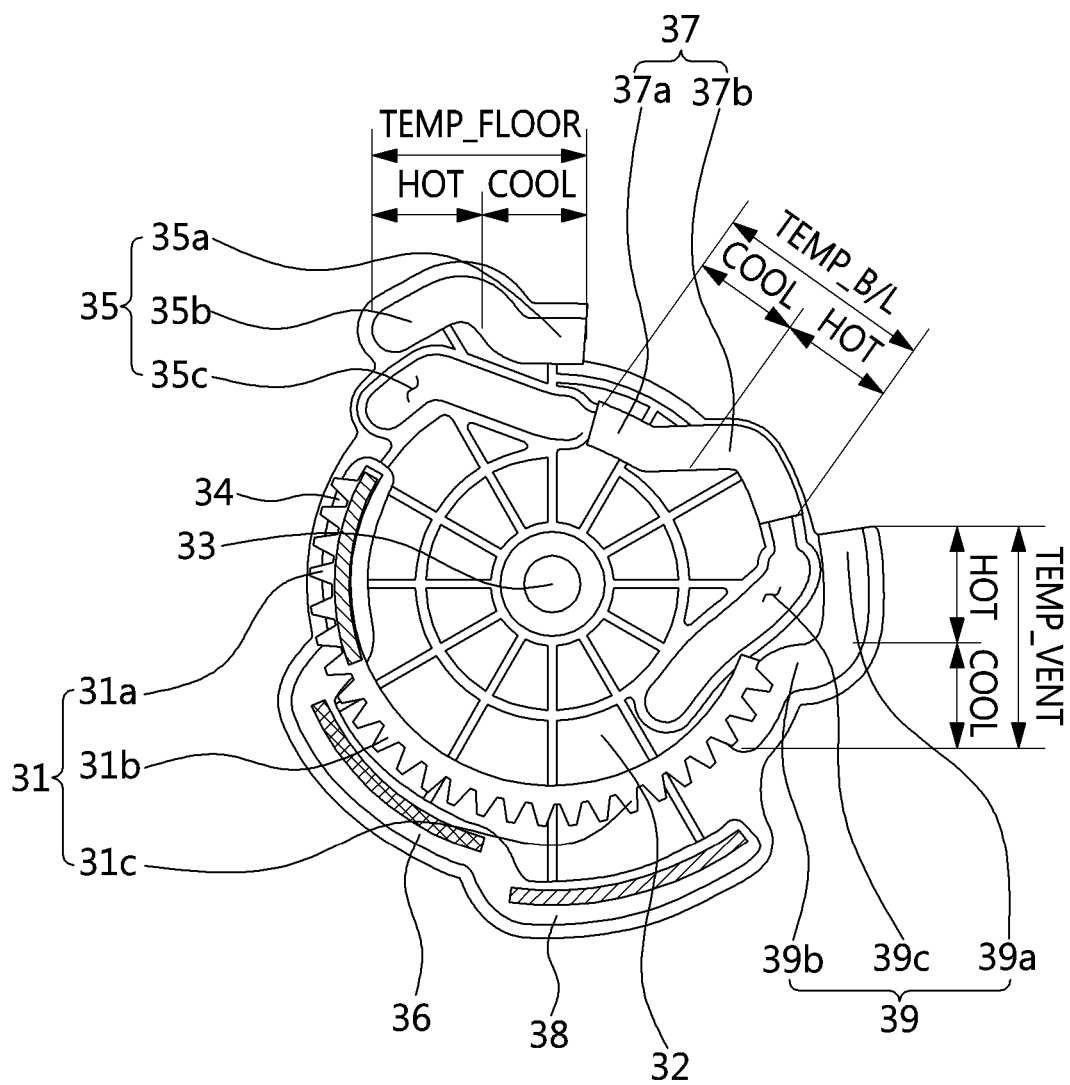
FIG. 4 is a plan view illustrating a main lever of the air conditioner for the vehicle according to an exemplary embodiment of the present invention.

FIG. 4 is a plan view illustrating a main lever of the air conditioner for the vehicle according to an exemplary embodiment of the present invention.

The main lever 30 is formed in the shape of a disc protruding radially at a portion of a circumference thereof. Mode door trajectories 34, 36 and 38 are formed on the portion of the circumference, and temp door trajectories 35, 37 and 39 are formed at positions facing the mode door trajectories 34, 36 and 38.

Here, the trajectory is a kind of guide portion which is formed to guide and move first and second guide levers.

In this regard, the mode door trajectories 34, 36 and 38 and the temp door trajectories 35, 37 and 39 are formed in a non-linear configuration. In other words, the mode door trajectories 34, 36 and 38 and the temp door trajectories 35, 37 and 39 are not formed linearly but are formed non-linearly such that parts of the circumference are connected in multiple stages.

Furthermore, the mode door trajectories 34, 36 and 38 are formed as a trajectory.

That is, the mode door trajectories 34, 36 and 38 are formed such that each mode trajectory is connected as the trajectory, unlike the temp door trajectory 35, 37, 39 formed as a dual trajectory.

The mode door trajectories 34, 36 and 38 include a vent mode trajectory 34 which is formed adjacent to a gear portion 31a of the main lever 130, a bilevel mode trajectory 36 which is longer in radius than the vent mode trajectory 34 and is formed adjacent to a gear portion 31b, and a floor mode trajectory 38 which is longer in radius than the bilevel mode trajectory 36 and is formed adjacent to a gear portion 31c.

The vent mode trajectory 34 and the bilevel mode trajectory 36 are connected to each other, and the bilevel mode trajectory 36 and the floor mode trajectory 38 are also connected to each other.

Here, a mode door body 41 of the mode door 40 is connected via a link 43 to a mode door rotary pin 45. A side 47 of the mode door rotary pin 45 is connected to a first guide lever 71 moving along the mode door trajectories 34, 36 and 38.

Furthermore, another side of the mode door rotary pin 45 is rotatably connected at a predetermined position of the case body 19.

The temp door trajectory 35, 37, 39 is formed as the dual trajectory. That is, the temp door trajectory 35, 37, 39 has two trajectories to guide a second guide lever 73 having a dual structure, unlike the mode door trajectory 34, 36, 38 having the trajectory.

The temp door trajectories 35, 37 and 39 include a temp-vent trajectory 39 which is formed at a position facing the vent mode trajectory 34, a temp-bilevel trajectory 37 which is formed at a position facing the bilevel trajectory 36, and a temp-floor trajectory 35 which is formed at a position facing the floor mode trajectory 38.

The temp-vent trajectory 39 is formed as a dual trajectory, and includes an internal trajectory 39c which is located at an internal position with respect to a central shaft of the main lever 30 and is open at top and bottoms thereof, and external trajectories 39a and 39b that are located at an external position and is closed at a top thereof.

In this regard, one end portion of the second guide lever 73 is guided by the internal trajectory 39c, while another end portion of the second guide lever 73 is guided by the external trajectories 39a and 39b.

Furthermore, the temp-bilevel trajectory 37 is formed as a trajectory, and includes internal trajectories 37a and 37b that are closed at tops thereof.

In this regard, one end portion of the second guide lever 73 is guided by the internal trajectories 37a and 37b, while another end portion of the second guide lever 73 is moved outside the main lever 30.

Furthermore, the temp-floor trajectory 35 is formed as a dual trajectory, and includes an internal trajectory 35c which is located at an internal position with respect to a central shaft 33 of the main lever 30 and is open at top and bottoms thereof, and external trajectories 35a and 35b that are located at an external position and is closed at a top thereof.

Here, one end portion of the second guide lever 73 is guided by the internal trajectory 35c, while another end portion of the second guide lever 73 is guided by the external trajectories 35a and 35b.

Each of the trajectories 35, 37 and 39 of the temp door is formed such that a radius of a trajectory for forming a hot zone is greater than a radius of a trajectory for forming a cool zone.

The temp door 50 is connected via a link with a temp door rotary pin 55. A side of the temp door rotary pin 55 is connected to a second guide lever 73 moving along the temp door trajectories 35, 37 and 39.

Another side of the temp door rotary pin 55 is rotatably connected at a predetermined position of the case body 19. The temp door rotary pin 55 is connected to the temp door 50 through temp door link 57.

Furthermore, the second guide lever 73 is formed as a dual structure to move along a dual trajectory.

Accordingly, according to an exemplary embodiment of the present invention, both the mode door and the temp door are simultaneously driven via actuator to simultaneously control the mode and the temp, and the second guide lever is formed as the dual structure, thus allowing the temp door to be stably and smoothly operated when the mode door is not moved.

Figure 5A:
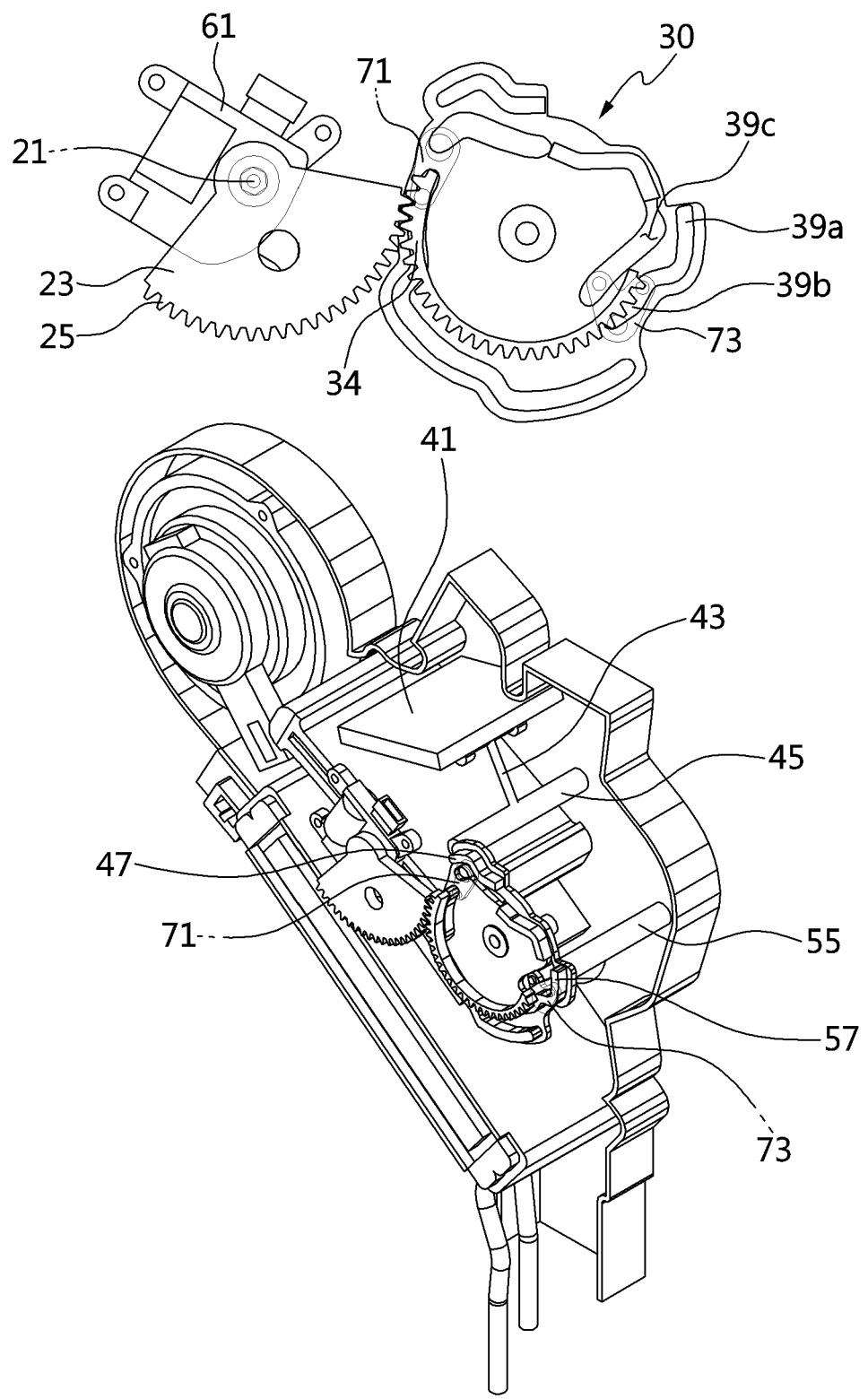
FIG. 5A is an operational perspective view illustrating the vent mode of the air conditioner for the vehicle according to an exemplary embodiment of the present invention.
Figure 5B:
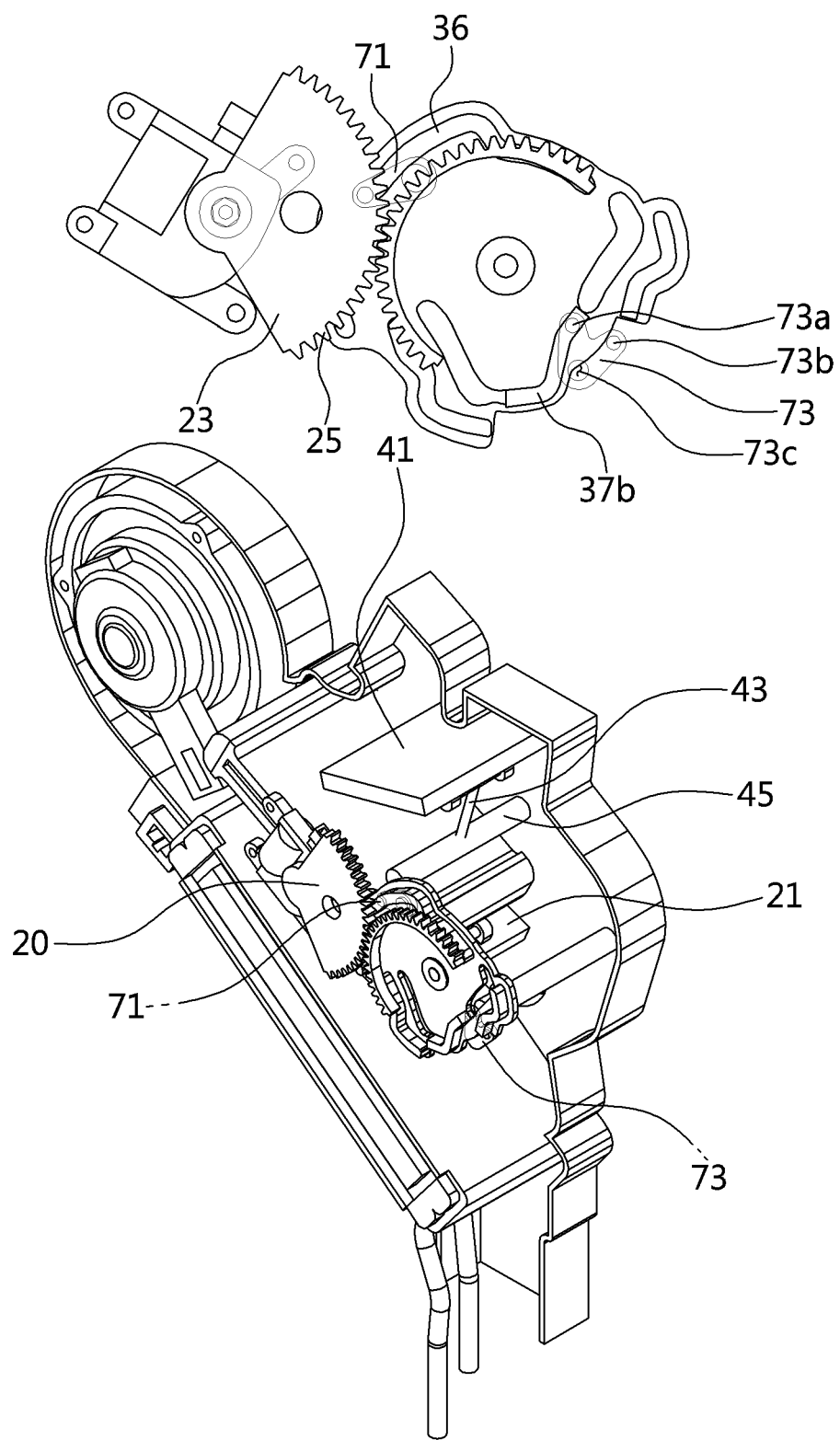
FIG. 5B is an operational perspective view illustrating the bilevel mode of the air conditioner for the vehicle according to an exemplary embodiment of the present invention.
Figure 5C:
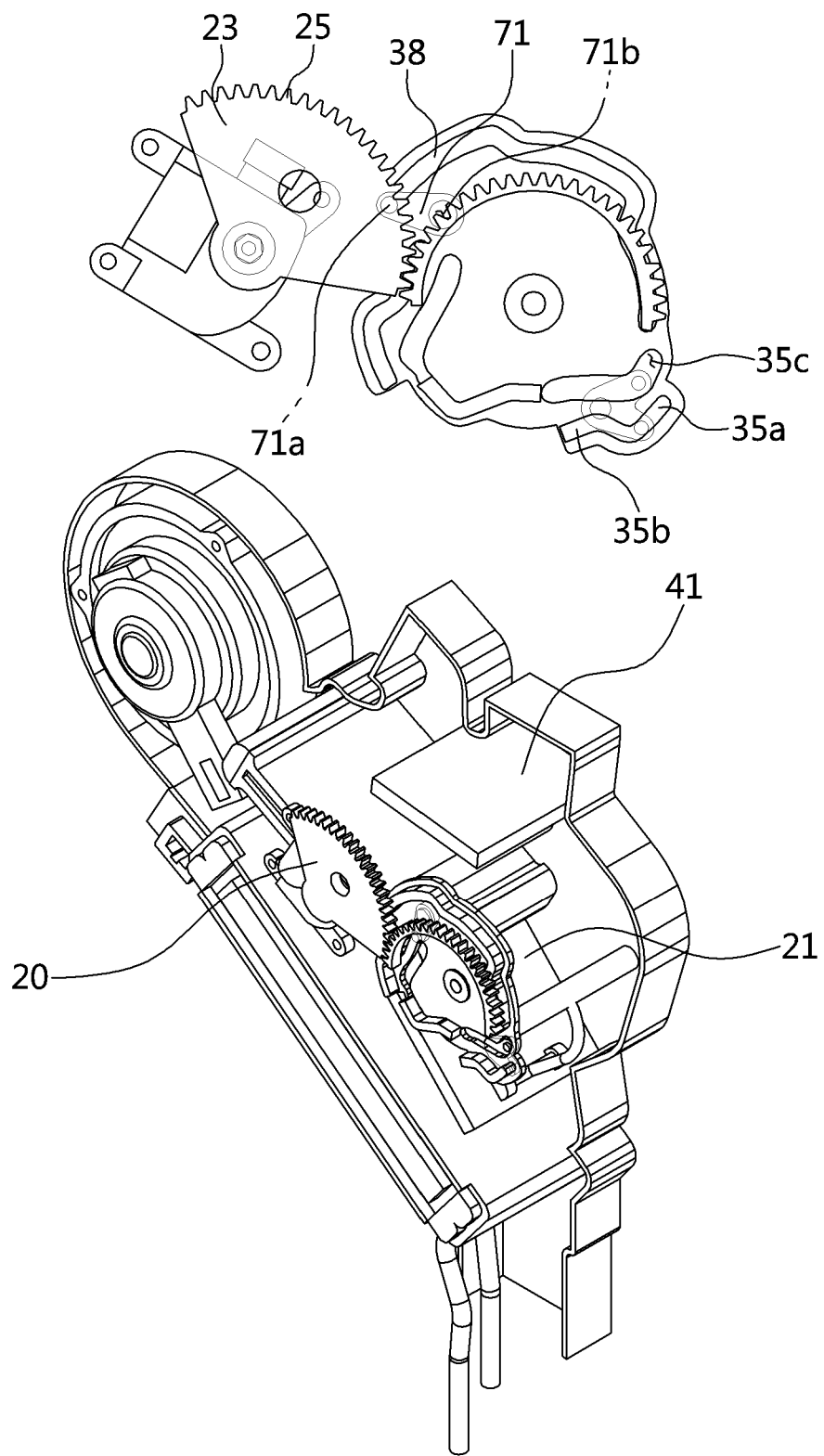
FIG. 5C is an operational perspective view illustrating the floor mode of the air conditioner for the vehicle according to an exemplary embodiment of the present invention.

FIG. 5A is an operational perspective view illustrating the vent mode of the air conditioner for the vehicle according to an exemplary embodiment of the present invention, FIG. 5B is an operational perspective view illustrating the bilevel mode of the air conditioner for the vehicle according to an exemplary embodiment of the present invention, and FIG. 5C is an operational perspective view illustrating the floor mode of the air conditioner for the vehicle according to an exemplary embodiment of the present invention.

Referring to FIG. 5A, the first guide lever 71 is located at the vent mode trajectory 34, and the second guide lever 73 is located at the temp-vent trajectory 39. The temp door 50 may perform a cooling operation or a heating operation while moving from the cool zone to the hot zone. As the actuator lever 20 rotates on axis 21(23), the main lever 30 engaged with it performs different modes along the motions of the first guide lever 71 and the second guide lever 73.

Furthermore, referring to FIG. 5B, the first guide lever 71 is located at the bilevel mode trajectory 36, and the second guide lever 73 is located at the temp-bilevel trajectory 37. The temp door 50 may perform a cooling operation or a heating operation while moving from the cool zone to the hot zone.

Furthermore, referring to FIG. 5C, the first guide lever 71 is located at the floor mode trajectory 38, and the second guide lever 73 is located at the temp-floor trajectory 35. The temp door 50 may perform a cooling operation or a heating operation while moving from the cool zone to the hot zone.

Figure 6:
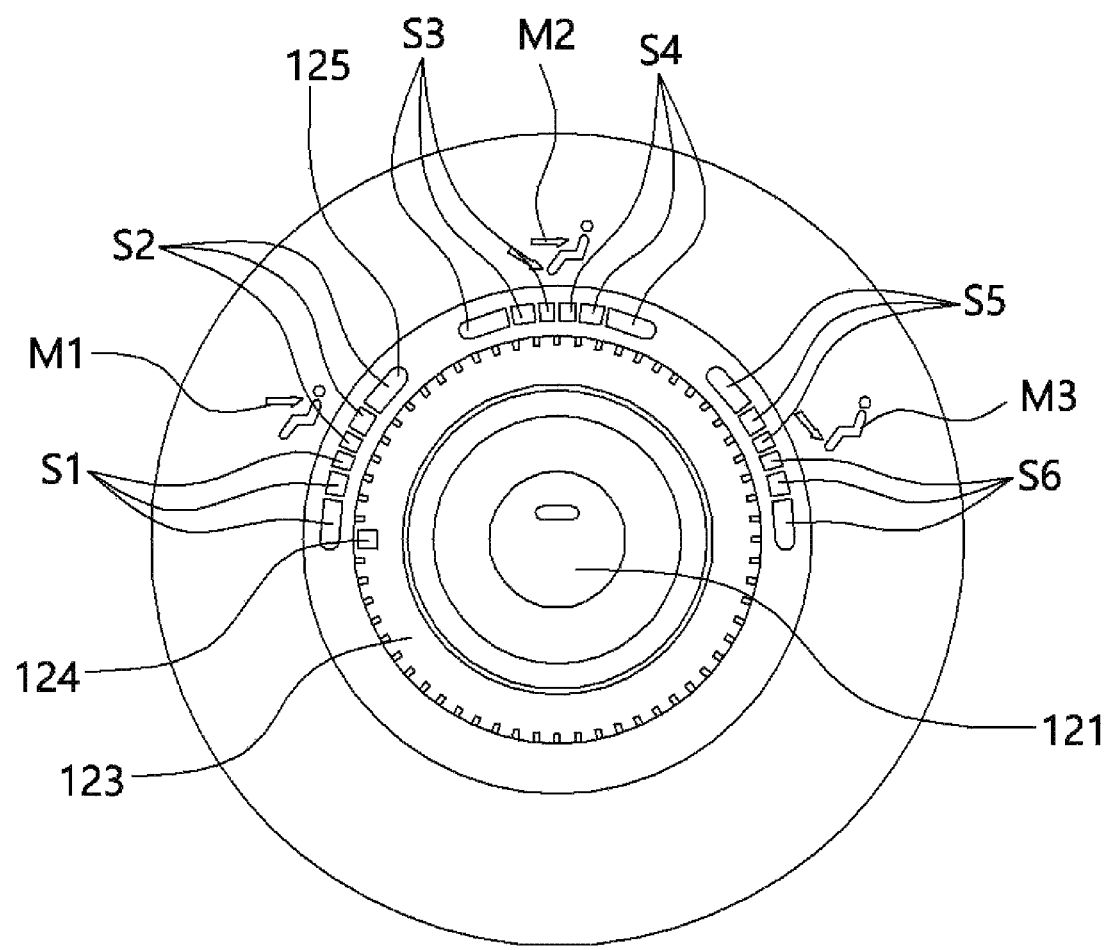
FIG. 6 is a front view illustrating a controller of the air conditioner for the vehicle according to an exemplary embodiment of the present invention.

FIG. 6 is a front view illustrating a controller of the air conditioner for the vehicle according to an exemplary embodiment of the present invention.

Referring to FIG. 6, the controller of the air conditioner for the vehicle according to an exemplary embodiment of the present invention includes a display device 125, a mode selecting device 123, and an indicating device 124.

The display device 125 is formed in a annular shape, and the mode selecting device 123 is formed to be surrounded by the display device 125.

A vent mode M1, a bilevel mode M2, and a floor mode M3 are successively displayed on the display device 125. First symbols S1 and S2 are formed adjacent to the vent mode M1, second symbols S3 and S4 are formed adjacent to the bilevel mode M2, and third symbols S5 and S6 are formed adjacent to the floor mode M3.

That is, the display device 125 may have symbols that are successively formed on a side with respect to the central line of the mode selecting device 123 to indicate each mode and air temperature.

For example, the display device 125 may have first symbols S1 and S2 that are formed on a left side with respect to a bilateral center line (diameter) of the mode selecting device 123 to indicate the vent mode M1 and the air temperature, second symbols S3 and S4 that are formed on an upper side with respect to the bilateral center line of the mode selecting device 123 to indicate the bilevel mode M2 and the air temperature, and third symbols S5 and S6 that are formed on a right side with respect to the bilateral center line of the mode selecting device 123 to indicate the floor mode M3 and the air temperature.

In the present connection, the first symbol S1 may denote heating and the first symbol S2 may denote cooling, the second symbol S3 may denote cooling and the second symbol S4 may denote heating, and the third symbol S5 may denote heating and the third symbol S6 may denote cooling.

Furthermore, it is possible to indicate a maximum heating mode or a maximum cooling mode at left and right end portions of each symbol indicating the air temperature of the display device 125.

The mode selecting device 123 may be formed to simultaneously control both the temp door and the mode door, and may be formed in the shape of a disc or a ring to be rotatable relative to the display device 125.

Furthermore, the indicating device 124 may be formed in the mode selecting device 123 to indicate a predetermined portion of the display device 125.

Furthermore, an on-off switch 121 may be formed on a center portion of the mode selecting device 123 to turn on or off the air conditioner for the vehicle. Although not shown in the drawings, an air-volume control device may be provided on a side of the controller to control the volume of air blown by the blower device 13.

With such a structure, if a passenger of a vehicle operates the mode selecting device 123 of the controller, power is applied by the on-off switch 121, so that the electric motor of the actuator 60(61) is driven and a driving force is transmitted to the main lever 30. Accordingly, the temp door and the mode door are operated to appropriately perform the temperature control and the mode selection.

Thus, the mode selecting device 123 is rotated clockwise or counterclockwise in the order of the vent mode, the bilevel mode, and the floor mode or in a reverse order, thus selecting an air conditioning mode.

At left and right end portions of each symbol indicating the air temperature of the display device 125, a maximum heating mode or a maximum cooling mode is selected.

Therefore, various aspects of the present invention are directed to providing a controller of an air conditioner for a vehicle, in which a display device has symbols that are successively formed on a side with respect to a central line of a mode selecting device to indicate each mode and air temperature, thus facilitating a convenient operation, reducing the number of components due to an integrated mode/temp structure, and realizing an aesthetic design.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air conditioner for a vehicle including a case body having a floor outlet, a roof outlet, an evaporator, and a heater core, a mode door adjusting an opening amount of each of vents, and a temp door adjusting an opening amount of a cold-air passage and a hot-air passage, the air conditioner including:
   an actuator lever connected to an actuator provided in the case body; and
   a main lever connected to the actuator lever to control the mode door and the temp door by the actuator,
   wherein the main lever is formed in a shape of a disk protruding radially at a portion of a circumference thereof, a mode door trajectory is formed on a first portion of the circumference of the main lever, and a temp door trajectory is formed at a second portion of the main lever, the second portion positioned to face the mode door trajectory,
   wherein the temp door is slidably counted to the temp door trajectory,
   wherein the temp door trajectory is formed as a dual trajectory, and
   wherein the temp door trajectory includes an internal trajectory is formed adjacent to a center of the main lever and an external trajectory is formed outside the internal trajectory.

2. The air conditioner of claim 1, wherein each of the mode door trajectory and the temp door trajectory is formed non-linear.

3. The air conditioner of claim 2, wherein the mode door trajectory is formed as a single trajectory.

4. The air conditioner of claim 3, wherein the mode door trajectory includes:
   a vent mode trajectory formed adjacent to a gear portion of the main lever;
   a bilevel mode trajectory formed to be longer in radius from a center of the main lever than the vent mode trajectory; and
   a floor mode trajectory formed to be longer in radius from the center of the main lever than the bilevel mode trajectory,
   wherein the vent mode trajectory, the bilevel mode trajectory and the floor mode trajectory continuously are formed to be the signal trajectory.

5. The air conditioner of claim 3, wherein the mode door is connected via a link with a mode door rotary pin, and a first side of the mode door rotary pin is connected to a first guide lever moving along the mode door trajectory.

6. The air conditioner of claim 5, wherein a second side of the mode door rotary pin is rotatably connected at a predetermined position of the case body.

7. The air conditioner of claim 1, wherein the temp door trajectory includes:
   a temp-vent trajectory formed at a position facing the vent mode trajectory;
   a temp-bilevel trajectory formed at a position facing the bilevel trajectory; and
   a temp-floor trajectory formed at a position facing the floor mode trajectory,
   wherein the temp-vent trajectory and the temp-floor trajectory are formed as the dual trajectory.

8. The air conditioner of claim 7, wherein each of the trajectories of the temp door is formed such that a radius of a trajectory for forming a hot zone is greater than a radius of a trajectory for forming a cool zone.

9. The air conditioner of claim 7, wherein each of the temp-vent trajectory and the temp-floor trajectory includes:
   the internal trajectory which is open at a top portion and a bottom portion thereof to penetrate the main lever and is adjacent to a center of a circle of the main lever; and the external trajectory which is formed around the internal trajectory and is closed at a top thereof.

10. The air conditioner of claim 9, wherein the temp-bilevel trajectory is connected to the internal trajectory, and is formed as a trajectory which is closed at a top thereof.

11. The air conditioner of claim 7, wherein the temp door is connected via a link with a temp door rotary pin, and the temp door rotary pin is connected at a first side thereof with a second guide lever moving along the temp door trajectory.

12. The air conditioner of claim 11, wherein the second guide lever is formed as a dual structure to move along the dual trajectory.

13. The air conditioner of claim 11, wherein the temp door rotary pin is rotatably connected at a second side thereof at a predetermined position of the case body.

* * * * *